United States Patent
Slavin

(10) Patent No.: US 11,966,710 B2
(45) Date of Patent: *Apr. 23, 2024

(54) SYSTEM AND METHOD FOR IMPLEMENTING AN OPEN DIGITAL RIGHTS LANGUAGE (ODRL) VISUALIZER

(71) Applicant: JPMorgan Chase Bank, N.A., New York, NY (US)

(72) Inventor: Ilya Slavin, Allen, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,730

(22) Filed: May 5, 2023

(65) Prior Publication Data

US 2023/0274097 A1     Aug. 31, 2023

Related U.S. Application Data

(63) Continuation of application No. 17/142,348, filed on Jan. 6, 2021, now Pat. No. 11,669,696.

(60) Provisional application No. 62/957,443, filed on Jan. 6, 2020.

(51) Int. Cl.
| | |
|---|---|
| G06F 16/90 | (2019.01) |
| G06F 16/904 | (2019.01) |
| G06F 40/12 | (2020.01) |
| G06F 40/205 | (2020.01) |
| G06F 40/274 | (2020.01) |
| G06F 40/55 | (2020.01) |

(52) U.S. Cl.
CPC ............ *G06F 40/55* (2020.01); *G06F 16/904* (2019.01); *G06F 40/12* (2020.01); *G06F 40/205* (2020.01); *G06F 40/274* (2020.01)

(58) Field of Classification Search
None
See application file for complete search history.

(56) References Cited

U.S. PATENT DOCUMENTS

| | | |
|---|---|---|
| 7,565,438 B1 | 7/2009 | Zhu |
| 7,685,642 B2 | 3/2010 | Gilliam |
| 9,940,681 B2 | 4/2018 | Connell |
| 10,068,301 B2 | 9/2018 | Connell |
| 10,445,698 B2 | 10/2019 | Hunn |
| 2004/0059929 A1 | 3/2004 | Rodgers et al. |
| 2007/0204078 A1 | 8/2007 | Boccon-Gibod et al. |
| 2008/0120240 A1 | 5/2008 | Ginter et al. |
| 2008/0228578 A1 | 9/2008 | Mashinsky |
| 2010/0268528 A1 | 10/2010 | Raskina |
| 2017/0287090 A1 | 10/2017 | Hunn |
| 2018/0174255 A1 | 6/2018 | Hunn |
| 2020/0104296 A1 | 4/2020 | Hunn |
| 2020/0134711 A1 | 4/2020 | Dawson |
| 2021/0398232 A1 | 12/2021 | Slavin |

*Primary Examiner* — Maikhanh Nguyen
(74) *Attorney, Agent, or Firm* — GREENBLUM & BERNSTEIN, P.L.C.

(57) ABSTRACT

According to an embodiment of the present invention, an innovative ODRL Visualizer is a graphical web-based tool that loads a digital contract, resolves various ontologies that are referenced, parses standard forms (such as ISO 8601 standard guiding the way to notate periods of time) and converts the digital contract to a human-readable form.

16 Claims, 2 Drawing Sheets

ODRL Visualizer

Market Data Services

| | | |
|---|---|---|
| @prefix | xsd | http://purl.org/dc/terms/ |
| @prefix | xsd | http://example.org/xsd/ |
| @prefix | dct | http://purl.org/dc/terms/ |
| @prefix | rdf | http://www.w3.org/1999... |
| @prefix | rdfs | http://www.w3.org/2000... |
| @prefix | odrl | http://www.ns/odrl/2/ |
| :T1 | a | odrl:Agreement |
| :T1 | odrl:permission | :T1-P1 |
| :T1 | odrl:assigner | <http://www.exchange... |
| :T1 | odrl:assignee | <http://www.Bank1... |
| :C2 | a | odrl:Constraint |
| :C2 | odrl:leftOperand | rbim:recipientModel |
| :C2 | odrl:Operator | odrl:eq |
| :C2 | odrl:rightOperand | rbim:internalModel, rbim... |
| exchange:ex1 | a | rbim:Resource |
| exchange:ex1 | rdfs:label | "EX1" |
| exchange:ex1 | rbim:contentNature | rbim:dynamic |
| exchange:ex2 | a | rbim:Resource |
| exchange:ex2 | rdfs:label | "EX2" |
| exchange:ex2 | rbim:contentNature | rbim:dynamic |
| :A1 | a | odrl:Asset |
| :A1 | rdf:value | exchange:ex1, exchange:e... |
| :A1 | odrl:refinement | :C3 |
| :C3 | a | odrl:Constraint |
| :C3 | odrl:leftOperand | rbim:timelinessOfDel... |
| :C3 | odrl:operator | odrl:lt |
| :C3 | odrl:rightOperand | "PT10M"^^xsd:duration |
| rbim:non-display | a | odrl:Action |
| rbim:non-display | odrl:includedIn | odrl:use |
| rbim:non-display | rdfs:isDefinedby | rdim: |

110: @prefix rows
112: :T1 rows
114: :C2 rows
116: exchange:ex1/ex2 rows
118: :A1 rows
120: :C3 rows
122: rbim:non-display rows

Right panel

130 Agreement: A Policy that grants the assignee a Rule over an Asset from an assigner.
- *http://www.exchange/therefore known as the "assigner"*
- *http://www.Bank1.com/therefore known as the "assignee"*

132 Permission: The ability to perform an Action over an Asset

134 Targets:
- EX1
- EX2

136 Refinements:
- timelinessOfDelivery Less than 10 minutes / 138

140 Actions:

Trading as a principal (A1)

Use of exchange information to trade as a principal on a global markets group exchange and for all other information, trading as a principal

*Included in:* Trade automatically
*Included in:* Non-display use

Non-viewable use of information in any system, process, program, machine or calculation other than in order to display or distribute information for display. Such use may include, SAMPLE but is not limited to, calculation of P&L, portfolio valuation, order processing, use within Automated Trading Systems and automated order routing

*Included in:* Use
To use the Asset

Constraint:

142
- recipientModel Equal to enterpriseModel
- recipientModel Equal to internalModel

SYSTEM AND METHOD FOR IMPLEMENTING AN OPEN DIGITAL RIGHTS LANGUAGE (ODRL) VISUALIZER

CROSS REFERENCE TO RELATED APPLICATIONS

This application is a Continuation of U.S. patent application Ser. No. 17/142,348, filed on Jan. 6, 2021, (now U.S. Pat. No. 11,669,696), which claims priority to U.S. Provisional Application 62/957,443, filed Jan. 6, 2020. The disclosure of each of these documents, including the specification, drawings, and claims, is incorporated herein by reference in its entirety.

FIELD OF THE INVENTION

The invention relates generally to a system and method for implementing an Open Digital Rights Language (ODRL) visualizer to automatically translate digital agreements from machine readable language into human readable language.

BACKGROUND OF THE INVENTION

Machine readable contracts written in Rights Expression Languages are generally not fit for human consumption. One such language under development by a standardization body is ODRL (Open Digital Rights Language) which is of particular interest to the Financial Services industry due to its ability to express complex agreements. ODRL is a policy expression language that represents statements about the usage of content and services. This is particularly relevant in the Market Data domain. Market Data generally refers to price and trade-related data for a financial instrument and associated indices generated by trading venues. Accordingly, the licenses controlling corresponding usage are frequently complex. However, in order for any firm or entity to agree to use any particular digital contract, non-technologists need to compare its meaning to agreements (including agreements in paper form) that have a force of contract law behind them. These individuals are typically lawyers or vendor managers, and cannot be expected to read Rights Expression Languages.

These and other drawbacks exist.

SUMMARY OF THE INVENTION

According to one embodiment, the invention relates to a system that implements an Open Digital Rights Language (ODRL) Visualizer. The system comprises: an electronic input that receives one or more digital contracts; a memory component that stores and manages digital contracts and corresponding data; an interactive user interface that receives one or more user inputs; and a computer processor coupled to the electronic input, the memory component and the interactive user interface, the computer processor is further programmed to perform the steps of: receiving and uploading a digital contract; identifying and resolving one or more ontologies associated with one or more terms of the digital contract; parsing the digital contract to generate a standard form; responsive to the standard form, automatically converting the digital contract into a human readable format; and generating a display for the interactive user interface that comprises a first pane that displays machine readable contract and a second pane that simultaneously displays corresponding human readable data version of the machine readable contract; wherein the first pane comprises a prefix section, a target section, a constraints section, an applicable datasets section and an actions section.

According to another embodiment, the invention relates to a method that implements an Open Digital Rights Language (ODRL) Visualizer. The method comprises the steps of: receiving and uploading, via an electronic input, a digital contract; identifying and resolving, via a computer processor, one or more ontologies associated with one or more terms of the digital contract; parsing, via the computer processor, the digital contract to generate a standard form; responsive to the standard form, automatically converting, via the computer processor, the digital contract into a human readable format; and generating, via an interactive user interface, a display for the interactive user interface that comprises a first pane that displays machine readable contract and a second pane that simultaneously displays corresponding human readable data version of the machine readable contract; wherein the first pane comprises a prefix section, a target section, a constraints section, an applicable datasets section and an actions section; and wherein the computer processor is coupled to the electronic input, a memory component that stores and manages digital contracts and corresponding data, and the interactive user interface.

The system may include a specially programmed computer system comprising one or more computer processors, interactive interfaces, electronic storage devices, and networks. The computer implemented system and method described herein provide unique advantages to entities, users and other participants, according to various embodiments of the invention. An embodiment of the present invention is directed to interpreting agreements in machine readable language into an understandable format for non-technical users. With an embodiment of the present invention, a vendor manager may easily compare and verify a technical digital contract for accuracy and further confirm that it matches its paper counterpart. In addition, a user may highlight a particular term and determine where the term came from, verify the interpretation is accurate and further drill down on various terms and meanings.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 1 is an exemplary interface of an ODRL Visualizer, according to an embodiment of the present invention.

DETAILED DESCRIPTION OF THE PREFERRED EMBODIMENT(S)

Figure 2:
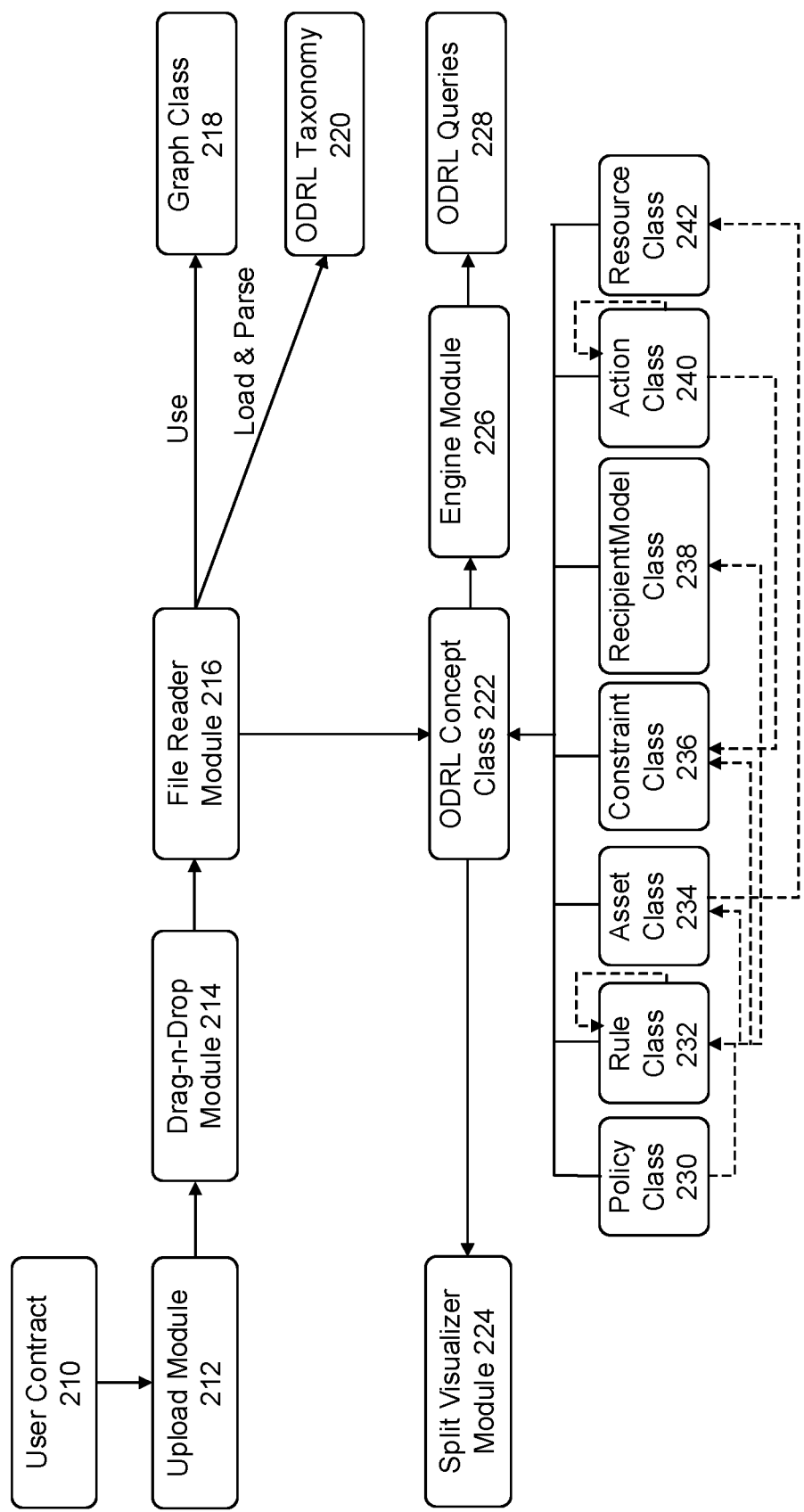
FIG. 2 is an exemplary process flow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to an ODRL Visualizer, which may include a graphical web-based tool that loads digital contracts, resolves referenced ontologies, parses standard forms (e.g., ISO 8601 standard guiding the way to notate periods of time) and converts the digital contracts into a human-readable form. An ontology may generally refer to a representation or other naming or definition of categories, properties and relations between certain data. According to an embodiment of the present invention, the ODRL Visualizer may generate and display multiple interactive interfaces. For example, the ODRL Visualizer may provide two interactive panes side-by side to facilitate correlation. With the ODRL Visualizer, if a user (or reader) were to wonder where a particular statement comes from in either machine- or human-readable document, the user may select that statement with a mouse click (or other user interaction) and the corresponding section in both panes may be highlighted (or otherwise identified). Accordingly, the innovative tool allows non-technologists to perform validations and drill down on certain terms and meanings. This is particularly useful when a firm is about to start working under a digital contract and wants to confirm that its meaning matches the paper one (or other source document) that was agreed to. Other validations and confirmations may be performed.

Digital Rights Management for Market Data, an initiative being worked on by an industry body, is meant to be an end-to-end process that automates the entire value chain of market data production, distribution, consumption and compliance. However, the opacity of underlying contracts has turned away a number of participants who would otherwise benefit from this technology. ODRL Visualizer brings the human element back into the complex process and allows firms to implement DRM in their spaces. Accordingly, once digital contracts are published by various organizations, the ODRL Visualizer may initiate and facilitate the process of acceptance of the new and changed agreements.

With an embodiment of the present invention, an overall process workflow for adoption and use of DRM may be realized. Additional features may include document management, version control, notifications, integration with public repositories of digital contracts, etc. For example, an embodiment of the present invention may be integrated with a contract management system and further enable the ability to trace changes in terms definitions across families of related agreements (e.g., Master Service Agreement (MSA) to Addenda to Exhibits) as well as track the evolution of terms through time and across other metrics. In addition, an embodiment of the present invention may also base a "what are my rights" feature or tool on this technology. The ODRL Visualizer may be integrated with a Digital Rights Management architecture, as described in co-pending and commonly owned U.S. patent application Ser. No. 17/142,395, entitled "System and Method for Implementing a Digital Rights Management Adoption Reference Architecture,", which claims priority to U.S. Provisional Application Ser. No. 62/957,440, entitled "System and Method for Implementing a Digital Rights Management Adoption Reference Architecture,", the contents of which are incorporated by reference herein in their entirety.

FIG. 1 is an exemplary interface of an ODRL Visualizer, according to an embodiment of the present invention. The ODRL Visualizer may include multiple portions and panes, including a machine-readable portion and a human-readable portion.

As shown in FIG. 1, Pane 102 may display machine-readable content derived from a digital contract. In this example, Pane 102 may contain sections including Prefix 110, Target (T1) represented by 112, Constraints (C2) represented by 114, applicable datasets 116 (represented by "exchange" which may include EX1, EX2), Actions (A1) represented by 118, Constraints (C3) represented by 120 and Usage Types (e.g., non-display) 122. Other sections and details may be provided as they relate to other types of digital contracts and applications. Pane 104 provides a corresponding human readable section. In this example, Agreement 130 may correspond to T1, as shown by 112. Permission details are shown at 132 and may correspond to 112. Permissions 132 may further include Targets 134, Refinements 136, Actions 140 and Constraints 142. Targets 134 may correspond to a global markets company 116 represented by "exchange" which may include EX1, EX2. Refinements 136 may correspond to C3, as shown by 120. Actions 140 may be derived from 118, 122. Constraint 142 may correspond to C2, as shown by 114. As demonstrated in FIG. 1, a user may highlight a section as shown by 138 and corresponding section C3 120 may be highlighted (shown in dashed lines). This feature enables a user to select various portions of an Agreement as displayed in Pane 104 and view corresponding ODRL at Pane 102.

For a particular document, an embodiment of the present invention may identify various ontologies and corresponding definitions that are referenced by the document. For example, terms and/or definitions may be grouped by similar prefixes or other identifying data.

With the ODRL Visualizer, a user does not need extensive computer science background to understand a machine readable contract. For example, a contract may reference a term such as "PT10M." A typical user may not have an understanding of that term. By interacting with the term using the ODRL Visualizer, a user may easily ascertain that PT10M is a standard term that means "less than 10 minutes."

With an embodiment of the present invention, a user may interact with one or more terms on either pane to identify additional details including where the term came from (or other source or origination information), how a term is used in different contexts, whether the interpretation is correct as well as other data to validate and confirm details. This may be a useful feature when negotiating with an original vendor. This may also be useful when a problem is identified and this information may be shared with a technologist or other party.

An embodiment of the present invention may create a document structure that references data defined within the document as well as other documents. This may occur by identifying common prefixes (or other identifiers). An embodiment of the present invention may recognize a certain prefix and then access a corresponding ontology or other source of information. An embodiment of the present invention may regroup terms so that corresponding related data that are identified throughout a document or set of documents may be brought together in a single view for user-readability and interpretation. An embodiment of the present invention seeks to apply interpretation rules to various terms so that terms such as "PT10M" may be easily understandable. A user may also check or verify the validity of a document. This may involve ensuring that the document does not contain references to documents or resources that do not exist and other discrepancies that could cause legal and other risks.

Once information is collected, an embodiment of the present invention may translate a decision tree based on an ODRL structure that defines targets, actions, constraints, permissions, series of permissions, parties, etc. With an ODRL structure, an embodiment of the present invention may identify and define targets (where targets may have refinements), actions (where actions may have constraints), permission sets, counterparties, legal structures, superseding terms, etc. In addition, an embodiment of the present invention may apply templates or variations thereof to facilitate document processing and analysis.

FIG. 2 is an exemplary process flow, according to an embodiment of the present invention. FIG. 2 illustrates an exemplary embodiment that calls out Javascript libraries that perform specific tasks. For example, an embodiment of the present invention may be performed on a client's web browser. Other implementations and variations may be provided.

As shown by 210, a digital contract may be received and loaded in a Visualizer Tool. According to an exemplary illustration, User Contract 210 may include Resource Description Format (RDF) in Turtle format. The digital contract may be loaded via Upload Module 212 and Drag-n-Drop Module 214. For example, a user may drag and drop a digital contract for analysis. According to another example, an embodiment of the present invention may identify a document for a particular user based on policy data, which may be managed at a policy store.

File Reader Module 216 may then access Graph Class 218 and load and parse ODRL Taxonomy 220. For example, Graph Class 218 may represent N3 Graph Class. File Reader Module 216 may communicate with ODRL Concept Class 222.

Split Visualizer Module 224 may generate a side-by-side display where a user may verify the data and interpretations. Accordingly, the machine readable contract may be converted into a human readable form. This may involve translating a decision tree from top to bottom based on a general structure that defines targets, constraints, permissions, etc. The decision tree or structure may be generated on the fly as permission sets and other characteristics are identified.

ODRL Concept Class 222 may communicate with Engine Module 226 and execute ODRL Queries 228 (e.g., RQ file, etc.). For example, Engine Module 226 may include SPARQL Engine Module that represents an open-source framework for building SPARQL query engines in Javascript/Typescript. ODRL Concept Class 222 may apply various classes of data, including Policy Class 230, Rule Class 232, Asset Class 234, Constraint Class 236, Recipient Model Class 238, Action Class 240 and Resource Class 242. An embodiment of the present invention may support various interactions between/among the classes.

An embodiment of the present invention is directed to analyzing a single digital contract as well as multiple digital contracts including a set of related contracts. The set of related contracts may include various permutations and further represent relationships with one or more vendors.

An embodiment of the present invention may also provide a high level view through an interactive graphic, which may include a tree view of agreements. For example, a term may be identified and then various uses and definitions of the terms may be highlighted in the tree view. In this example, a term may be used in an addendum with a specific definition. The same term may be used in a corresponding master agreement in a slightly different context. An embodiment of the present invention may identify the terms and how the terms are used within each document. In addition, a corresponding context may be provided for each term, including definitions, uses, scopes, etc. This feature provides insights into a migration and evolution of terms within the flow of an agreement or set of agreements.

An embodiment of the present invention is directed to a relationship tree between different agreements. For a master agreement, a set of related agreements may be displayed in a graphical interface through a tree or other format. This may involve multiple layers of subsequent and related agreements and other documents or references. Depending on user input, an embodiment of the present invention may respond with a corresponding view. This may include viewing a specific term or concept within the relationship tree of agreements. In addition, a user may search within a select group of agreements, subset of agreements or even the entire tree of agreements.

An embodiment of the present invention recognizes that certain terms may have different meanings to different parties and in different contexts. This may be particularly relevant to rights and obligations. There may be an instance where a term may attach additional meaning and details. For example, a dataset may be sent to a client X with no additional rights and obligations. The same dataset may be sent to a client Y where the data from the dataset may be used in benchmarking an index. For this dataset to client Y, disclaimers and specific logos may be required. An embodiment of the present invention facilitates the ability to track a set of requirements which can differ greatly from one information provider to another. For example, index research may pull information from many different parties. An embodiment of the present invention may determine how to create a conjunction of all encumbrances that apply to an agreement, family of agreements or other set of agreements. An embodiment of the present invention may analyze agreements for underlying data and extract meaning of terms, rights and obligations. An embodiment of the present invention may be directed to generating various logical operations in a tree of agreements.

With an embodiment of the present invention, a user may search for terms within an agreement of a set of agreements and then identify sections that contain the terms. This enables a user to view context and gain insights on how meanings may morph within the agreement or set of agreements. An embodiment of the present invention may also be directed to merging rights and obligations into a single view. This view may identify actions "A" that can be performed, actions "B" that cannot be performed and actions "C" that must be performed. Other variations on detailed rights and obligations may be provided.

An embodiment of the present invention may store agreements with associated data in a data store or other storage component. The data may be stored in a hierarchy to provide the ability to traverse various nodes, for example. An embodiment of the present invention may provide a graph style tree with the ability to zoom in to details of a particular agreement to see how the agreement uses or defines a term.

An embodiment of the present invention may be directed to a visualizer that provides a contract hierarchy that highlights which agreements allow a user to perform a certain action. In this example, the tree style view is from the perspective of rights. This may relate to which rights did an entity purchase and how do the rights apply. In this example, a node may represent a specific right for a specific use case.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements an Open Digital Rights Language (ODRL) Visualizer, the system comprising:
an electronic input that receives one or more digital contracts;
a memory component that stores and manages digital contracts and corresponding data; an interactive user interface that receives one or more user inputs; and a computer processor coupled to the electronic input, the memory component and the interactive user interface, the computer processor is executed to perform the steps of:

receiving and uploading a digital contract in a visualizer tool;

identifying and resolving one or more ontologies associated with one or more terms of the digital contract;

parsing the digital contract to generate a standard form;

responsive to the standard form, automatically converting the digital contract into a human readable format, wherein the converting comprises translating a decision tree from top to bottom based on an ODRL structure; and generating a display for the interactive user interface that comprises a first pane that displays machine readable contract and a second pane that simultaneously displays corresponding human readable data version of the machine readable contract;

wherein the first pane comprises a prefix section, a target section, a constraints section, an applicable datasets section and an actions section, wherein responsive to a user selection on the second pane, a corresponding machine readable portion is highlighted in the first pane, and wherein the second pane that simultaneously displays corresponding human readable data further comprises one or more of: permission sets, targets, refinements, and constraints.

2. The system of claim 1, wherein responsive to a user selection on the first pane, a corresponding human readable portion is highlighted in the second pane.

3. The system of claim 1, wherein the digital contract is uploaded by a user or automatically uploaded.

4. The system of claim 1, wherein the first pane that displays machine readable contract further comprises one or more sections each identified by a prefix identifier.

5. The system of claim 1, wherein the digital contract comprises a set of multiple contracts.

6. The system of claim 1, wherein interacting with a term on either pane provides a corresponding definition.

7. The system of claim 1, wherein interacting with a term on either pane provides a corresponding definition through multiple contracts.

8. The system of claim 1, wherein interacting with a term on either pane provides one or more term origination details.

9. A method that implements an Open Digital Rights Language (ODRL) Visualizer, the method comprising the steps of:

receiving and uploading, via an electronic input, a digital contract in a visualizer tool;

identifying and resolving, via a computer processor, one or more ontologies associated with one or more terms of the digital contract;

parsing, via the computer processor, the digital contract to generate a standard form;

responsive to the standard form, automatically converting, via the computer processor, the digital contract into a human readable format, wherein the converting comprises translating a decision tree from top to bottom based on an ODRL structure; and generating, via an interactive user interface, a display for the interactive user interface that comprises a first pane that displays machine readable contract and a second pane that simultaneously displays corresponding human readable data version of the machine readable contract;

wherein the first pane comprises a prefix section, a target section, a constraints section, an applicable datasets section and an actions section;

wherein responsive to a user selection on the second pane, a corresponding machine readable portion is highlighted in the first pane;

wherein the second pane that simultaneously displays corresponding human readable data further comprises one or more of: permission sets, targets, refinements, and constraints; and wherein the computer processor is coupled to the electronic input, a memory component that stores and manages digital contracts and corresponding data, and the interactive user interface.

10. The method of claim 9, wherein responsive to a user selection on the first pane, a corresponding human readable portion is highlighted in the second pane.

11. The method of claim 9, wherein the digital contract is uploaded by a user or automatically uploaded.

12. The method of claim 9, wherein the first pane that displays machine readable contract further comprises one or more sections each identified by a prefix identifier.

13. The method of claim 9, wherein the digital contract comprises a set of multiple contracts.

14. The method of claim 9, wherein interacting with a term on either pane provides a corresponding definition.

15. The method of claim 9, wherein interacting with a term on either pane provides a corresponding definition through multiple contracts.

16. The method of claim 9, wherein interacting with a term on either pane provides one or more term origination details.

* * * * *